United States Patent
Nardone et al.

(10) Patent No.: US 6,535,885 B1
(45) Date of Patent: Mar. 18, 2003

(54) MULTIKEYED TABLE IMPLEMENTABLE ON A PERSONAL DIGITAL ASSISTANT

(75) Inventors: Joseph R. Nardone, Arlington, VA (US); Larry D. Mason, Normal, IL (US)

(73) Assignee: Aether Systems, Inc., Owings Mills, MD (US)

( * ) Notice: Subject to any disclaimer, the term of this patent is extended or adjusted under 35 U.S.C. 154(b) by 120 days.

(21) Appl. No.: 09/688,160

(22) Filed: Oct. 16, 2000

(51) Int. Cl.$^7$ ............................................. G06F 17/30
(52) U.S. Cl. .............................. 707/101; 707/3; 707/5; 707/6; 707/7; 707/103; 707/104
(58) Field of Search .................... 707/10, 100, 102, 707/2, 3, 4, 101, 104, 103, 5, 6, 7

(56) References Cited

U.S. PATENT DOCUMENTS

| | | | |
|---|---|---|---|
| 6,003,040 A | | 12/1999 | Mital et al. .................. 707/103 |
| 6,009,432 A | * | 12/1999 | Tarin ........................... 707/10 |

FOREIGN PATENT DOCUMENTS

| EP | 1130869 | 9/2001 | ........... H04L/29/06 |
|---|---|---|---|

OTHER PUBLICATIONS

Fiat et al., 1988, "storing and searching a multikey table," ACN, pp. 344–353.*
Fiat et al., 1991, "An Implicit data structure for searching a multikey table in logarithmic time," Journal of computer and system sciences vol. 43, pp. 344–424.*
Mounro, 1987, "searching a two key table under a single key," CAN pp. 383–387.*
Yao, 1981, "Should tables be sorted?," Journal of the Assoc. of computing Machinery, vol. 28, No. 3, pp. 615–628.*

* cited by examiner

Primary Examiner—Jean M. Corrielus
(74) Attorney, Agent, or Firm—Wilmer, Cutler & Pickering; John W. Ryan

(57) ABSTRACT

A multikeyed table utilizing a number of primary and secondary keys is implementable on a personal digital assistant. The table includes one or more records with each record having a plurality of fields. A number of fields in the records are designated as primary and secondary keys, which in turn are used for sorting and ordering the records. A target position in the multikeyed table may be identified by first receiving target primary and secondary keys from, for example, an application user. Subsequently, an operating system implemented in the personal digital assistant is prompted to select and return one record stored in the table. In response, the record selected by the operating system is received. The record received from the operating system is then compared with the target's primary and secondary keys, after which the target is indicated as having keys greater than, less than, or equal to the keys of the received record. This procedure is repeated until a record with primary and secondary keys equal to the target's primary and secondary keys is located, at which point the returned record is identified as the target position. Alternatively, the procedure is repeated until all records stored in the table have been identified as having primary and secondary keys greater than or less than the target's primary and secondary keys, at which point the target position is identified as falling between a highest record having primary and secondary keys less than the target primary and secondary keys and a lowest record having primary and secondary keys greater than the target primary and secondary keys.

48 Claims, 7 Drawing Sheets

| MODEL | ID# | COLOR | DOORS | ... |
|---|---|---|---|---|
| FORD | 39 | WHITE | 2 | |
| | 76 | BLUE | 2 | |
| | 89 | RED | 2 | |
| MAZDA | 26 | GRAY | 2 | |
| | 45 | WHITE | 4 | |
| | 129 | BLUE | 4 | |
| NISSAN | 13 | GREEN | 4 | |
| | 22 | YELLOW | 2 | |

MULTIKEYED TABLE IMPLEMENTABLE ON A PERSONAL DIGITAL ASSISTANT

FIELD OF THE INVENTION

The present invention relates generally to tables and databases. More particularly, the present invention relates to systems, methods and mediums for efficiently utilizing one or more primary and/or secondary keys implementable on a personal digital assistant in database tables.

BACKGROUND OF THE INVENTION

In the last few years, the popularity of small, mobile, hand-held remote computing devices, sometimes referred to as palmtop computers or personal digital assistants (PDAs), has grown considerably. Owing to their compact size, these remote devices are easily carried and transported by their users, allowing information to be entered and retrieved from a large number of settings and environments not normally accessible by traditional desktop computing units.

Early generation PDAs offered very limited functionality and were often restricted to serving as personal organizers or datebooks. Indeed, some early models grew out of scientific calculators, and were limited by tiny amounts of memory and equally small text-only LCD screens. Since then, PDAs have become much more powerful with some running versions of operating systems utilized previously only in much larger desktop computers. These later generation computers were extremely popular for use as industrial data-gathering devices.

To facilitate the collection of data, desktop versions of database programs such as spreadsheet applications and forms programs were implemented on the PDA devices. The PDAs could then be carried out into the field for use in collecting data. Surveys and inventories could be taken and stored into memory of the PDA devices. After completion of the data collection, the PDAs could be used to interface with desktop units or main computing servers to upload the information into a central location.

Information collected in this manner was typically stored in the PDA's memory, for example, in a table or database and indexed using a single key. For instance, a list of people could be stored in a table, alphabetically, according to each person's last name. In a similar manner, a classroom of children could be stored in a table, numerically, according to each child's age. These single keyed tables and databases were more than sufficient for simple applications or small groups of items. However, as the size of the lists and the sophistication of the users increased, these databases could no longer provide the functionality required by the ever-increasing complexity of the new applications. For instance, a large list of people could include numerous people having the same last name. With a single keyed table, there was no way to distinguish between two or more people named "Smith". Similarly, children having the same age in a class would also be indistinguishable from one another.

Thus, it can be seen that the single keyed tables and databases are unable to sort and organize large amounts of data, particularly where numerous records possess the same key or index. What is therefore needed is a technique utilizable with PDAs and other palmtop devices for organizing and sorting large volumes of data and information.

One device that provides a multikeyed table includes Pendragon Forms 3.1 offered by Pendragon Software Corporation of Libertyville, Ill. However, increasingly efficient techniques for implementing such tables are needed.

SUMMARY OF THE INVENTION

The present invention addresses the problem described above by providing a multikeyed table which may be implemented on a personal digital assistant. In the present invention, the table implemented on the personal digital assistant is capable of storing one or more records with each record having a plurality of fields. A number of fields in the records are designated as primary and secondary keys, which in turn are used for sorting and ordering the records. By doing so, records may be sorted by more than one key or index. As a result, any number of primary and secondary keys may be utilized to distinguish one record from another.

To implement or manipulate the table (e.g., to find a particular record or location within the table), a target position is identified by first receiving target primary and secondary keys from, for example, an application user. Subsequently, an operating system implemented in the personal digital assistant is prompted to select and return one record stored in the table. The record returned by the operating system is then compared with the target's primary and secondary keys, after which the target is indicated as having keys which are either greater than, less than, or equal to the keys of the received record. This procedure is repeated until a record with primary and secondary keys equal to the target primary and secondary keys is located, at which point the returned record is identified as the target position. Alternatively, the procedure is repeated until all records stored in the table have been identified as having primary and secondary keys greater than or less than the target primary and secondary keys, at which point the target position is identified as falling between a highest record having primary and secondary keys less than the target primary and secondary keys and a lowest record having primary and secondary keys greater than the target primary and secondary keys.

BRIEF DESCRIPTION OF THE DRAWINGS

Various objects, features, and advantages of the present invention can be more fully appreciated as the same become better understood with reference to the following detailed description of the present invention when considered in connection with the accompanying drawings, in which.

DETAILED DESCRIPTION OF THE INVENTION

Figure 1:
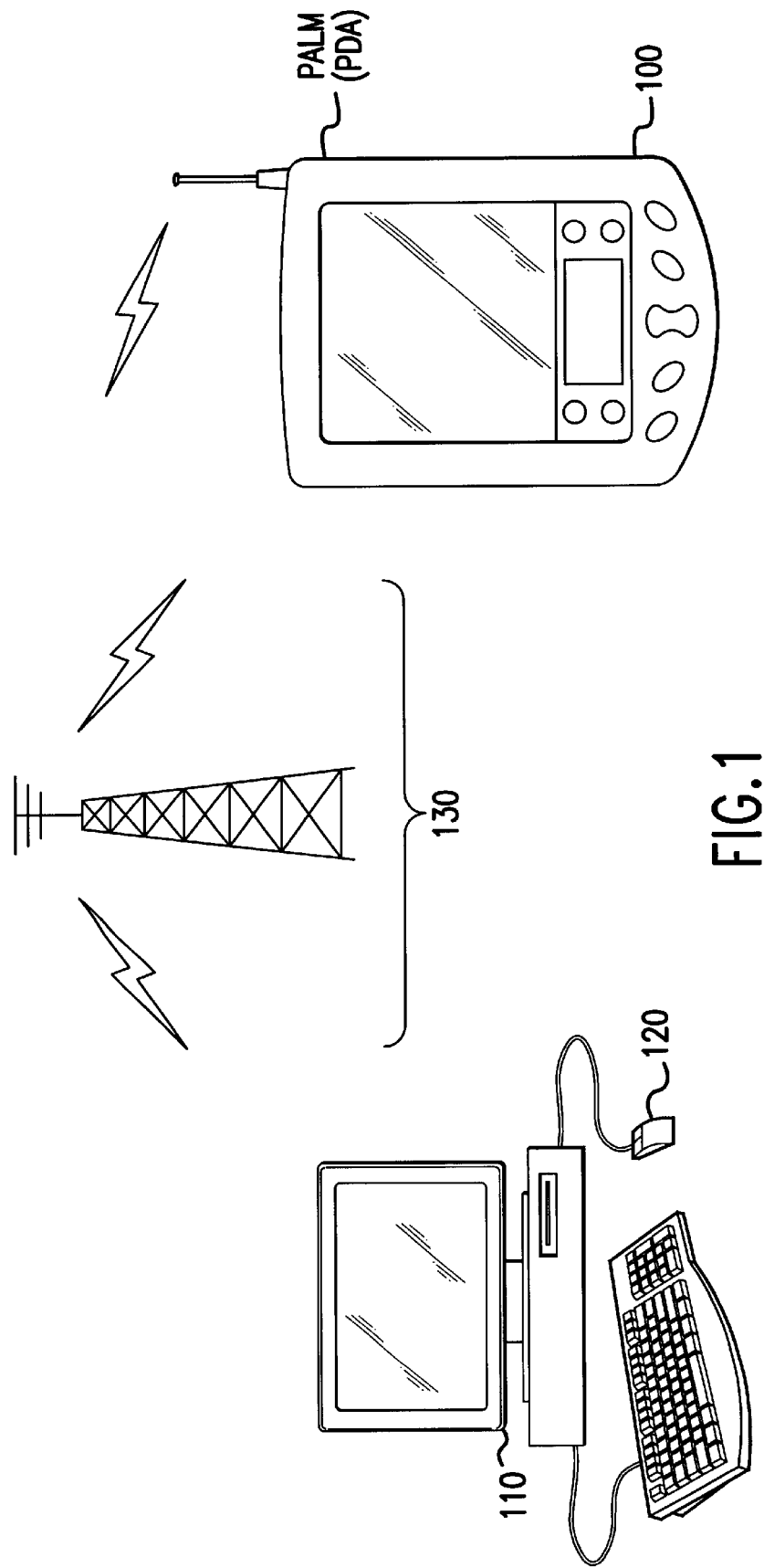
FIG. 1 is a block diagram of various components of the present invention capable of implementing and manipulating multikeyed tables.

Referring to FIG. 1, a portable handheld computer or personal digital assistant (PDA) 100 is utilized in conjunction with, for example a desktop or personal computer (PC) 110 to implement aspects of the present invention. PDA 100 may include, for example, any of a number of handheld devices such as those offered by Palm, Inc. of Santa Clara, Calif. including, for example Palm VII devices. PC 110, on the other hand, may include any of a number of different types of computers, such as those having Pentium™-based processors manufactured by Intel Corporation of Santa Clara, Calif.

In the example of FIG. 1, PDA 100 interfaces with PC 110 via cradle 120 to facilitate the transmission of data therebetween. In addition, communication between PDA 100 and PC 110 may also occur remotely via a wireless network 130 which may include, for example, wireless LANs/WANs, the Internet, intranets, or the like (as well as non-wireless variants thereof).

Embodiments of the present invention contemplate that PC 110 may be utilized to design and build applications which implement the multikeyed tables of the present invention. As will be discussed below, after an application and/or table has been designed, the application and/or table data may be transmitted to PDA 100 for implementation therein. Furthermore, once implemented, PDA 100 may be utilized to add, remove, modify or otherwise manipulate information stored in the tables.

Figure 2:
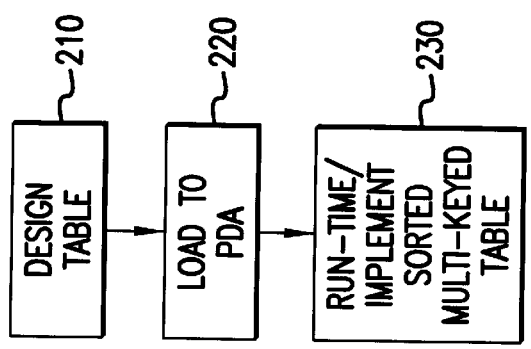
FIG. 2 depicts one example of a high-level process utilizable for designing a multikeyed table and for transmitting table metadata to a PDA in accordance with the concepts of the present invention.

Referring to FIG. 2, one example of a process utilizable for designing and transmitting application and/or table data to, for example, PDA 100 is now described. Using PC 110, a user or application designer initially designs an application utilizing, for example, a high-level programming language (step 210). As contemplated by embodiments of the present invention, the application may be designed so that it utilizes one or more multikeyed tables. For example, the designer may wish to build an inventory or supply management application, which makes use of a multikeyed table to track and tabulate inventory or supply items. Thus, during step 210 the designer inputs various pieces of application design data including, for instance, the application structure and format, graphics, algorithms for controlling the processing of the application, input/output routines, and like. In addition, as will be described below, information concerning the format or layout of any multikeyed tables (i.e., metadata) may also be entered. For example, the designer may include the number of fields in each record and the type of data that may be stored in the individual fields. Similarly, the designer may include a description of each of the fields, and the like. Furthermore, the user may also designate any number of fields as being primary or secondary keys, which, as will be discussed below, may be utilized in the implementation of the mulitkeyed table and in the sorting and ordering of the records stored therein.

Figure 3:
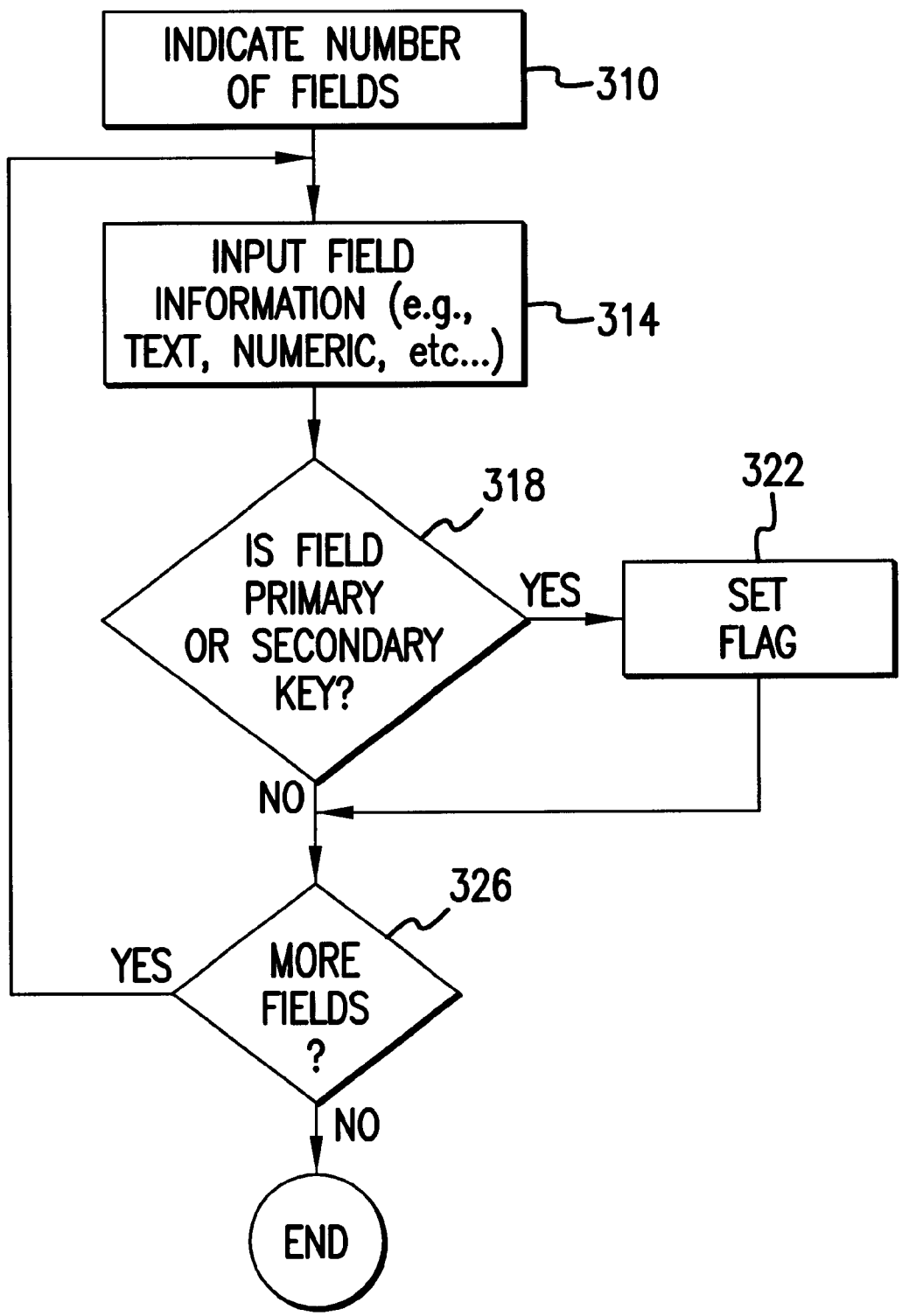
FIG. 3 depicts one example of a process utilizable for designing or modeling a multikeyed table of the present invention.

One example of a process utilizable for designing a multikeyed table of the present invention is illustrated in FIG. 3. To start, the application designer initially enters the number of fields included with the records of a particular table (step 310). More specifically, each multikeyed table of the present invention represents a collection of one or more records where embodiments of the present invention contemplate that each record contains the same number of fields of information. A single record of a multikeyed table may be referred to as a row of the table. While the corresponding fields of each row may be identical, the data stored in a field may differ from row to row. Thus, the data stored in the first field in one record or row may differ from the data stored in a corresponding field of another record but still relate to and convey the same information.

Accordingly, after indicating the number of fields included with a record, the application designer indicates the type of information capable of being stored in each field (step 314). For example, the designer may limit the information to integers, decimals, real numbers, imaginary numbers, dates, times, money, or combinations thereof, and the like. Or the designer may indicate that the field includes single characters, character strings, or a combination of both numbers and characters. In addition, the designer may limit the fields to particular words or phrases such as "yes", "no" or other choices. With these cases, it may be possible to present possible choices to the designer in the form of a pull-down menu or the like.

After inputting the type of information capable of being stored in each field, the designer may designate any number of fields as primary or secondary keys (step 318). In addition, the application designer may also indicate the order in which the records should be sorted. For example, the designer may indicate that the records are to be sorted in alphabetical, numerical, increasing, or decreasing order, and the like. By including primary and secondary keys in a table, the records may be maintained in the order selected by the designer. For instance, the records may be stored in an ascending, descending, or alphabetical order by the value of the information stored in the key rows of the table. Furthermore, a number of records may have the same primary key and still be distinguishable from one another. In cases where multiple keys exist, the designer may prioritize the individual keys. For example, a listing of a group of people may utilize last names as a primary key and first names and middle initials as secondary keys. Hence, the above group of people could be sorted first, for example, alphabetically, according to their last names (i.e., by primary key order). Then, people having the same last name could be sorted according to their first names (i.e., by secondary key order). If any of the people in this example possessed the same first and last name, ordering could turn lastly to each person's middle initial.

Upon designating a field as a primary or secondary key, a flag or some other similar mechanism may be set to indicate the field's status as a primary or secondary key (step 322). Furthermore, each key may be prioritized with respect to each of the other keys. From there, the process repeats or continues until all of the fields have been addressed (step 326).

Embodiments of the present invention contemplate that the design and building of the applications and tables may occur utilizing, for example, a visual and/or menu driven development environment. In particular, table fields and labels may be entered into text fields of a popup window, opened, for example, with the creation of each new table. Similarly, instructions and the selection of primary and/or secondary keys may be indicated using pulldown menus and the like.

Figure 4:
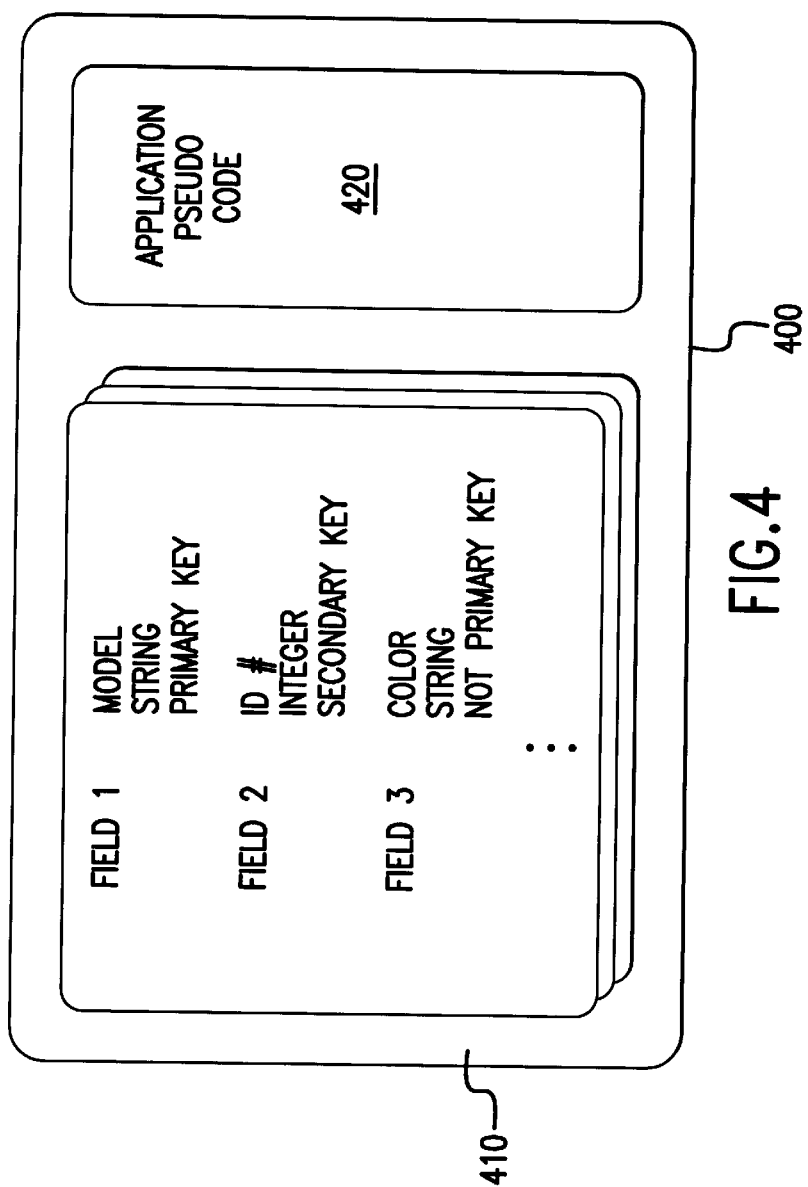
FIG. 4 depicts one example of an application program file suitable for storing table metadata in accordance with the principles of the present invention.

After designing and building an application and any multikeyed tables utilized therein, the application and/or any related information may be stored or packaged in an application program file 400 (shown in FIG. 4) and transmitted from PC 110 to PDA 100 (step 220). As depicted in FIG. 4, embodiments of the present invention contemplate that application program file 400 includes any keyed table metadata 410, application pseudocode 420, screen definitions, menu definitions, and any other related application or table information. In this example, application pseudocode 420 includes any code or instructions entered by the application designer during the design phase of the application. For instance, application pseudocode 420 may include the instructions or details utilized to implement the application on PDA 100, as embodied in source code, object code, a form of compiled code, or any combination thereof.

In contrast to application pseudocode 420, metadata 410 describes the characteristics of the multikeyed tables. For instance, metadata 410 may include a listing of the fields associated with each record, the type of data that may be stored in a particular field, remarks, and/or other similar information. Furthermore, metadata 410 also identifies whether each field is a primary or secondary key used for ordering or sorting of the individual records. As depicted in the example of FIG. 4, the records included in one table in application program file 400 include fields for listing a car type or "model" (FIELD 1), an identification number used to identify the car (FIELD 2), and the "color" of the car (FIELD 3). Similarly, application program file 400 may indicate that information stored in FIELDS 1 and 3 will be of the type STRING and information stored in HELD 2 will be of the type INTEGER. Furthermore, in the application program file of FIG. 4, FIELD 1 has been designated as a primary key, while FIELD 2 has been designated as a secondary key. Thus, the records implemented according to the metadata in FIG. 4 will be sorted first according to the data stored in FIELD 1, then according to the data stored in FIELD 2.

After application program file 400 has been loaded onto PDA 100, the application may be implemented and subsequently executed (step 230). As will be discussed below, any multikeyed tables utilized by the application may also be generated and later manipulated during application execution. Furthermore, although the multikeyed table depicted in the example of FIG. 2 is shown as being designed on PC 110 and subsequently transmitted to PDA 100, it is to be understood that the multikeyed table may also be designed and implemented on PDA 100 without the use of PC 110.

Figures 5, 6:
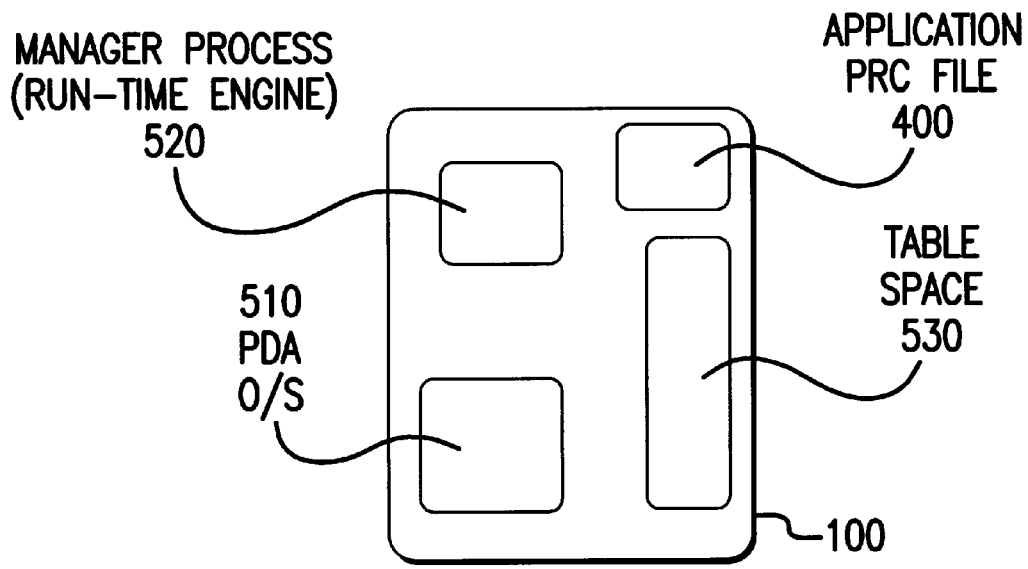
FIG. 5 depicts one example of a number of processes and/or components utilized by a PDA for implementing and manipulating multikeyed tables of the present invention.
FIG. 6 depicts one example of a multikeyed table implemented according to the present invention.

FIG. 5 depicts one example of the processes and/or components utilized by PDA 100 for implementing the multikeyed tables of the present invention. In the example of FIG. 5, PDA 100 includes an operating system or process 510 for overseeing the functioning of the PDA hardware and any application software. One example of operating system 510 includes Palm OS offered by Palm, Inc. of Santa Clara, Calif. In addition, PDA 100 may also include one or more application program files 400, loaded and stored in memory as described above in step 220.

PDA 100 also utilizes a manager process 520 operating in conjunction with operating system 510 to execute any application programs and to implement any multikeyed tables of the present invention. As contemplated by embodiments of the present invention, manager process 520 may include a database manager used to implement simple forms and the like. In other cases, manager process 520 may include one or more processes implemented as a portion of a much larger computing process such as, for example, a run-time engine or the like. Generally speaking, in these cases, run-time engines are responsible for executing application programs on PDA 100. For instance, the run-time engine may execute or implement the logic of an application program by retrieving instructions associated with the application, including, for example, screen definitions, menu definitions, and program scripts from an application program file. In these examples, manger process 520 would then comprise one or more subcomponents, computing routines, or subprocesses of the run-time engine responsible for implementing any of the multikeyed tables of the present invention.

Referring again to FIG. 5, as mentioned above, the information utilized by manager process 520 is generally stored in application program file 400, and transferred during, for example, step 220. Thus, the instructions and information mentioned above are retrieved by manager process 520 from application program file 400 at run-time to facilitate execution of the application. Likewise, metadata may also be retrieved by manager process 520 from application program file 400 for purposes of implementing any multikeyed tables of the present invention. Subsequently, multikeyed tables built according to the instructions and metadata associated with a particular application may be stored in PDA 100 at, for example, memory 530. Turning now to FIG. 6, one example of a multikeyed table stored in PDA 100 is now described. The multikeyed table in FIG. 6 depicts a database or table suitable for maintaining an inventory of cars. In this case, the cars may be sorted alphabetically according to, for example, each car's model type. Thus, a car's model type serves as the primary key. As a secondary key, the designer has designated the field storing the individual car ID numbers. Accordingly, all of the cars having the same model type are sorted in increasing ID number order. Furthermore, other information included with each field is also illustrated in FIG. 6, for exemplary purposes. For example, the color of the car may be included as well as the number of doors of each car. In addition, although the table of FIG. 6 includes only a single primary key and secondary key, it is to be understood that any number of fields may be designated as key fields. As will be discussed below, each additional record is placed or stored into the multikeyed table according to primary and secondary key order. By doing so, each of the records in a particular multikeyed table is also stored in a sorted or ordered listing. Furthermore, because each record is stored in primary and secondary key order, records may be retrieved or otherwise manipulated utilizing the records' position number within the table (in addition to using primary and secondary keys to locate the records). For example, a third record may be referenced using its position alone, i.e., the third position. In this manner, additional memory need not be devoted to maintaining pointers and the like.

Figure 7A:
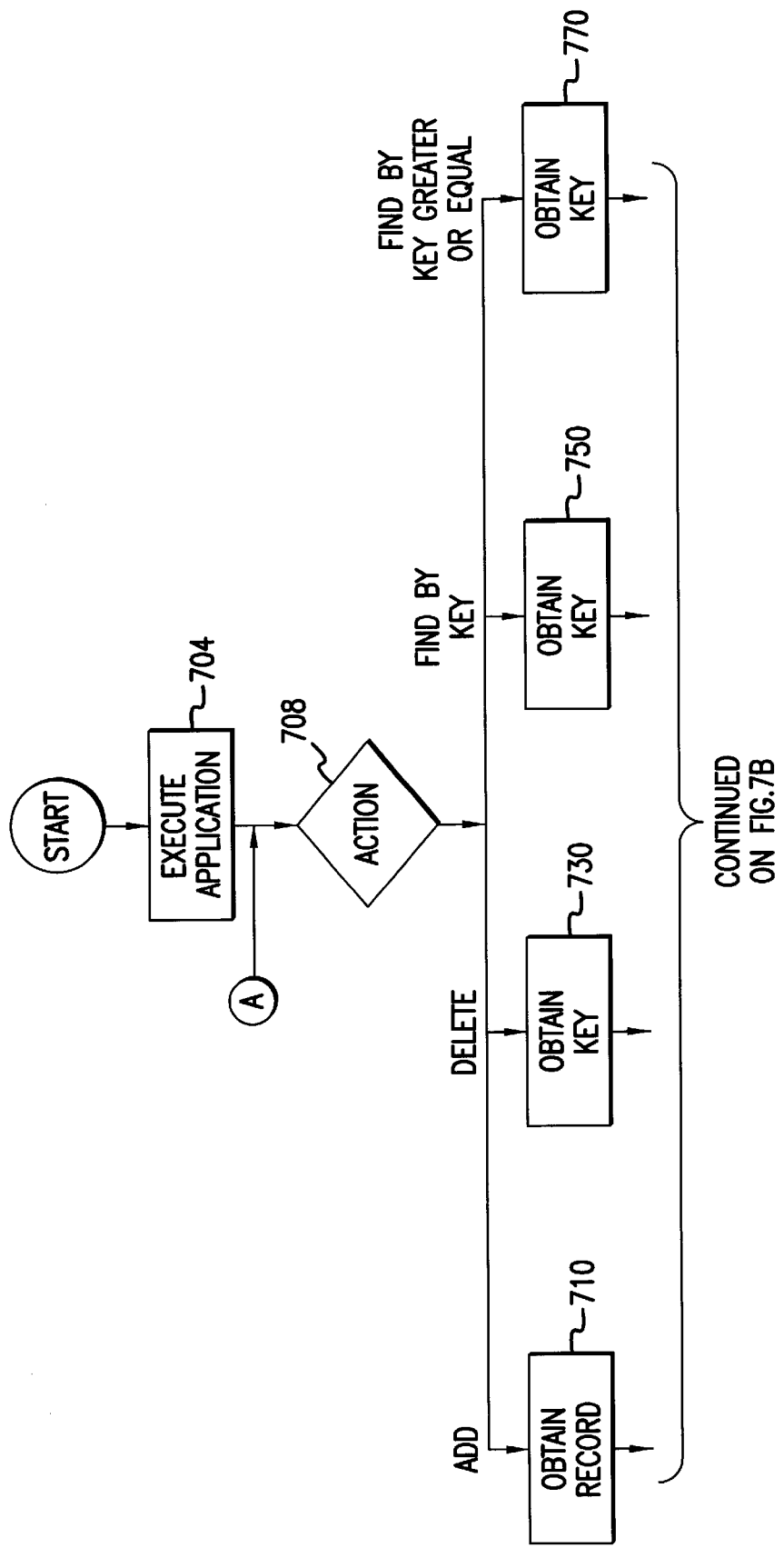
FIG. 7A depicts one example of a process utilizable for implementing and manipulating a multikeyed table of the present invention.

One example of a process utilizable for implementing and manipulating a multikeyed table of the present invention is illustrated in FIG. 7A. To commence processing, an application transmitted to PDA 100 is first executed (step 704). As discussed above, these applications are typically loaded onto PDA 100 via application program file 400 during, for example, step 220. From there, processing follows the logic determined by the designer and embodied in, for example, the pseudocode 420 stored in the application program file. Subsequently, during the course of application execution, any number of instructions or commands (step 708) may dictate the implementation of a new multikeyed table or the manipulation of an existing table. Four possible examples are illustrated in FIG. 7A.

For instance, an ADD command may be used to add a new record to an existing table or to create a new table by storing or adding a first record. In this example, a record or entry to be added to the new or existing multikeyed table is first obtained from an application user (step 710). In response (and also referring back to FIG. 5), manager process 520 calls operating system 510 requesting execution of a CALLBACK routine (step 712). As will be discussed below, the end result of executing the CALLBACK routine is the identification of a position or location where the entry may be stored (based upon, e.g., alphabetic order within the key fields). Hence, after calling or executing the CALLBACK routine, operating system 510 returns a position or location into which the entry may be written (step 714).

Figure 7B:
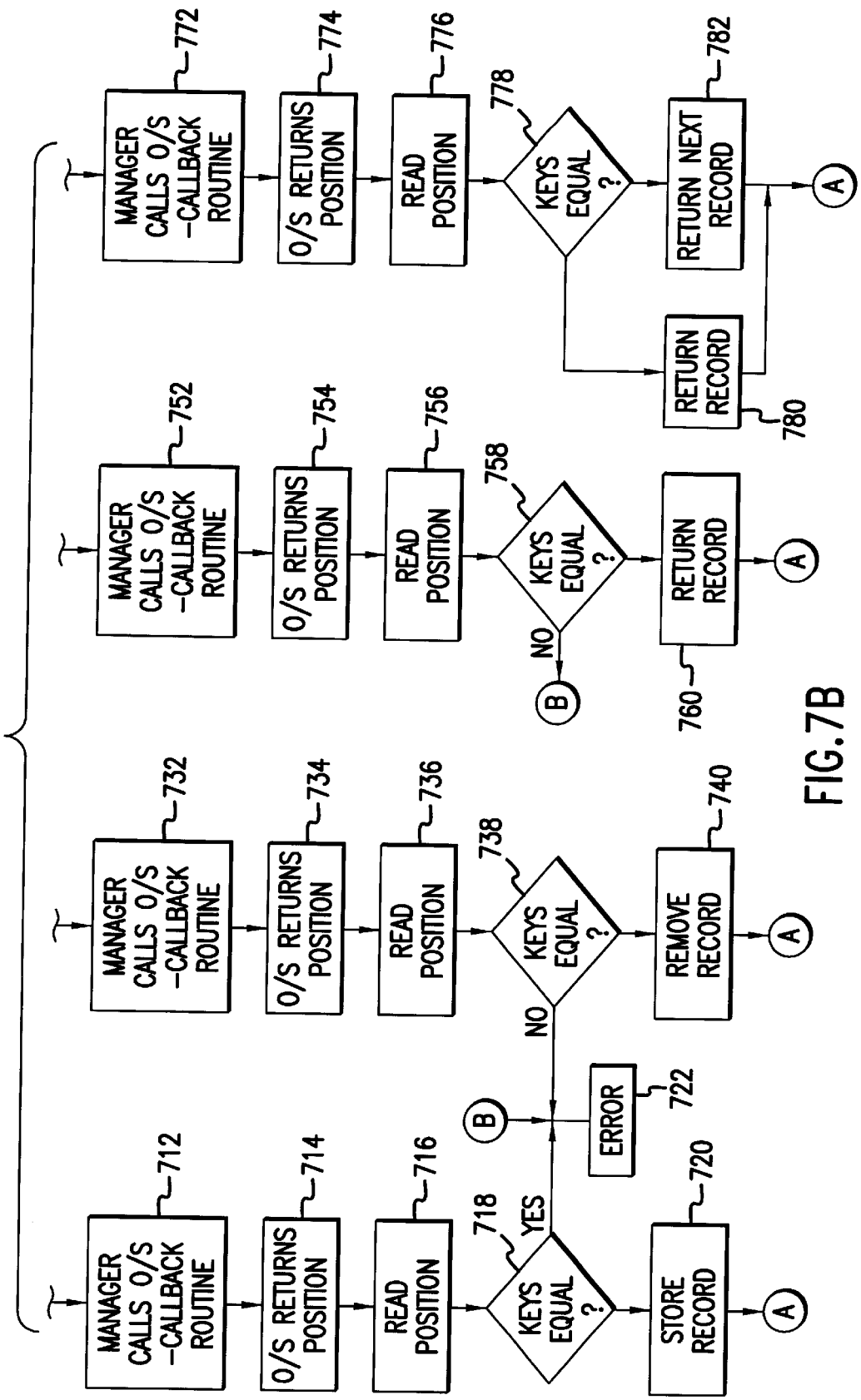
FIG. 7B depicts one example of a CALLBACK routine utilizable for identifying a position in a multikeyed table of the present invention.

Referring to FIG. 7B, one example of a CALLBACK routine is depicted. More specifically, processing of such a routine commences with operating system 510 checking the multikeyed table for any existing records (step 802). If no records exist, operating system 510 informs the manager process 520 that the table is currently empty or that no table exists (step 804). If the table is empty, then the new record is simply added as the first (and only) entry in the table (in accordance with step 720, mentioned below).

If, however, the multikeyed table is not empty, operating system 510 selects one record from the table (step 806), and then returns the selected record to manager process 520 (step 810). In this regard, embodiments of the present invention contemplate selecting a record according to one or more sorting or selection algorithms. For example, any of a number of binary, "Divide and Conquer", brute force, bubble searches, or the like, may be utilized.

After a record is returned, manager process 520 compares the primary and any secondary keys of the target record (i.e., the record to be added to the table) against the primary and secondary keys of the record returned by operating system 510 (step 814). Based on this comparison, manager process 520 returns an indication of whether the target's primary and secondary keys are greater than, less than, or equal to the primary and secondary keys of the record returned by operating system 510 (step 814). For example, in an embodiment that sorts keys in increasing numerical order, a target primary key ID of 76 would be greater than a returned primary key ID of 39. Similarly, in an embodiment that sorts keys in alphabetical order, a target primary key car model type of "Ford" would be less than a returned primary key car model type of "Mazda". In situations where the primary keys are equal, one or more secondary keys, such as vehicle ID number and/or model year, may be compared to determine the order. For example, a target record having a primary key model type of "Ford" and a secondary key vehicle ID of 346 would be greater than a returned record having the same primary key model type of "Ford" but a secondary key vehicle ID of 269. Then, as mentioned above, this indication of greater than, less than, or equal to is returned to operating system 510 for use in refining the search.

As described above, after indicating whether the target record is greater than, less than, or equal to the record returned by operating system 510, operating system 510 determines whether the target position (i.e., the location where the target is to be added to, removed from, or otherwise manipulated) has been located (step 826). The target position may be occupied by an existing record, or may be empty and fall between two existing records. More specifically, if the target record's primary and secondary keys are equal to the primary and secondary keys of the record returned by operating system 510, then the returned record is identified as being the target record or as occupying the target position. In a similar manner, if all of the records stored in the multikeyed table have been compared with the target record, and all of the records have primary and secondary keys that are either greater than or less than the primary and secondary keys of the target record, then the target record is to be stored in a position between the record having the lowest primary and secondary keys greater than the primary and secondary keys of the target and the record having the highest primary and secondary keys less than the primary and secondary keys of the target. Thus, using a set of records having primary keys of 3, 5, 7, 10, and 13, and a target having a primary key of 11, as an example, the lowest primary key greater than the target is 13, and the highest primary key less than the target is 10. Therefore, in this example, the position returned would fall between the records having primary keys of 10 and 13.

Returning to FIG. 7B, if a position is located, it is returned to manager process 520 (step 830). On the other hand, if a position is not located, the search algorithm utilized by operating system 510 is refined using the indication of greater than or less than received from manager process 520. For example, using a "Divide and Conquer" approach, operating system 510 would select the next record from the side of the previously returned record in which the target fell. Thus, if manager process 510 indicated that the target key was greater than a record with a key of 66, then the next record selected by operating system 510 would also be greater than 66. Whatever the case, this process continues until a position is located.

Returning to FIG. 7A, upon receiving a position from the CALLBACK routine as discussed above, manager process 520 retrieves or reads any information currently stored at the returned position (step 716). Manager process 520 then compares the information stored in the returned record's primary and secondary key fields against the target's primary and secondary keys (step 718). A comparison revealing that the keys are equal indicates that another record having identical primary and secondary keys exists. However, since (in many applications) records typically must have unique primary and secondary keys, embodiments of the present invention contemplate that this finding indicates that an error has occurred, and as such, causes an error or other message to be returned to the user (step 722). If the comparison indicates that the information stored at the returned position does not equal the target's primary and secondary keys, then the target may be stored at the returned position (step 720). Then, after adding the record, processing may return to decision step 708.

In contrast to the ADD command, a DELETE command may be used to remove a record from the multikeyed table. In this process, a primary and secondary key associated with the record to be removed (i.e., the target record) is initially obtained from the application user (step 730). In response, manager process 520 calls operating system 510 requesting execution of, for example, the CALLBACK routine discussed above (step 732). After calling or executing the CALLBACK routine, operating system 510 returns a position or location where the record to be removed is stored (step 734).

Subsequently, manager process 520 retrieves or reads the record stored at the position returned by operating system 510 (step 736) and compares the information stored in the primary and any secondary key fields against the target's primary and secondary keys (step 738). A comparison revealing that the keys are equal indicates that the target record has been located. As such, the target record may be deleted (step 740). However, if the comparison reveals that the keys are not equal, thus indicating, for example, that the record to be deleted does not exist, an error message may be returned to the application user (step 722). Then, after deleting the record, processing may return to decision step 708.

Like the DELETE command described above, records may also be located and examined by utilizing their primary and secondary keys. More specifically, primary and secondary keys, which are associated with the record to be located or examined (i.e., the target record), are first entered by the application user (step 750). Manager process 520 then calls operating system 510 to request the execution of, for example, the CALLBACK routine discussed above (step 752). Similar to the examples discussed above, after calling or executing the CALLBACK routine, operating system 510 returns a position or location from which the record to be located or examined is stored (step 754).

After receiving a position from operating system 510, manager process 520 retrieves or reads the record stored at the returned position (step 756) and compares the information stored in the primary and any secondary key fields against the target's primary and secondary keys (step 758). A comparison revealing that the keys are equal indicates that the target record has been located. As such, the target record may be returned to the application user for examination and/or manipulation (step 760). However, if the comparison reveals that the keys are not equal, thus indicating, for example, that the record to be examined does not exist, an error message may be returned to the application user (step 722). Then, after locating the record, processing may return to decision step 708.

Yet another example of a command that utilizes the records' primary and secondary keys includes the FIND BY KEY GREATER OR EQUAL. With this command, a record having primary and secondary keys equal to the keys entered by the application user, or the record stored immediately after the entered keys, is return for examination and/or manipulation by the user. In particular, primary and secondary keys associated with the record to be located or examined (i.e., the target record) are first entered by the application user (step 770). Manager process 520 then calls operating system 510 requesting the execution of, for example, the CALLBACK routine discussed above (step 772). After calling or executing the CALLBACK routine, operating system 510 returns a position or location where the record to be located or examined is stored (step 774).

Manager process 520 then retrieves or reads the record stored at the returned position (step 776) and compares the information stored in the primary and secondary key fields against the target's primary and secondary keys (step 778). If the comparison indicates that the keys are equal, then that record is returned to the application user for examination or manipulation (step 780). If the comparison reveals that the keys are not equal, then the next record is returned to the user for examination or manipulation (step 782). Thus, using a set of records having primary keys of 3, 5, 7, and 9 and a target record having a primary key of 7 as an example, the record having a next greater key is the record with the primary key 9. Then, after locating the record, processing may return to decision step 708.

Figure 8:
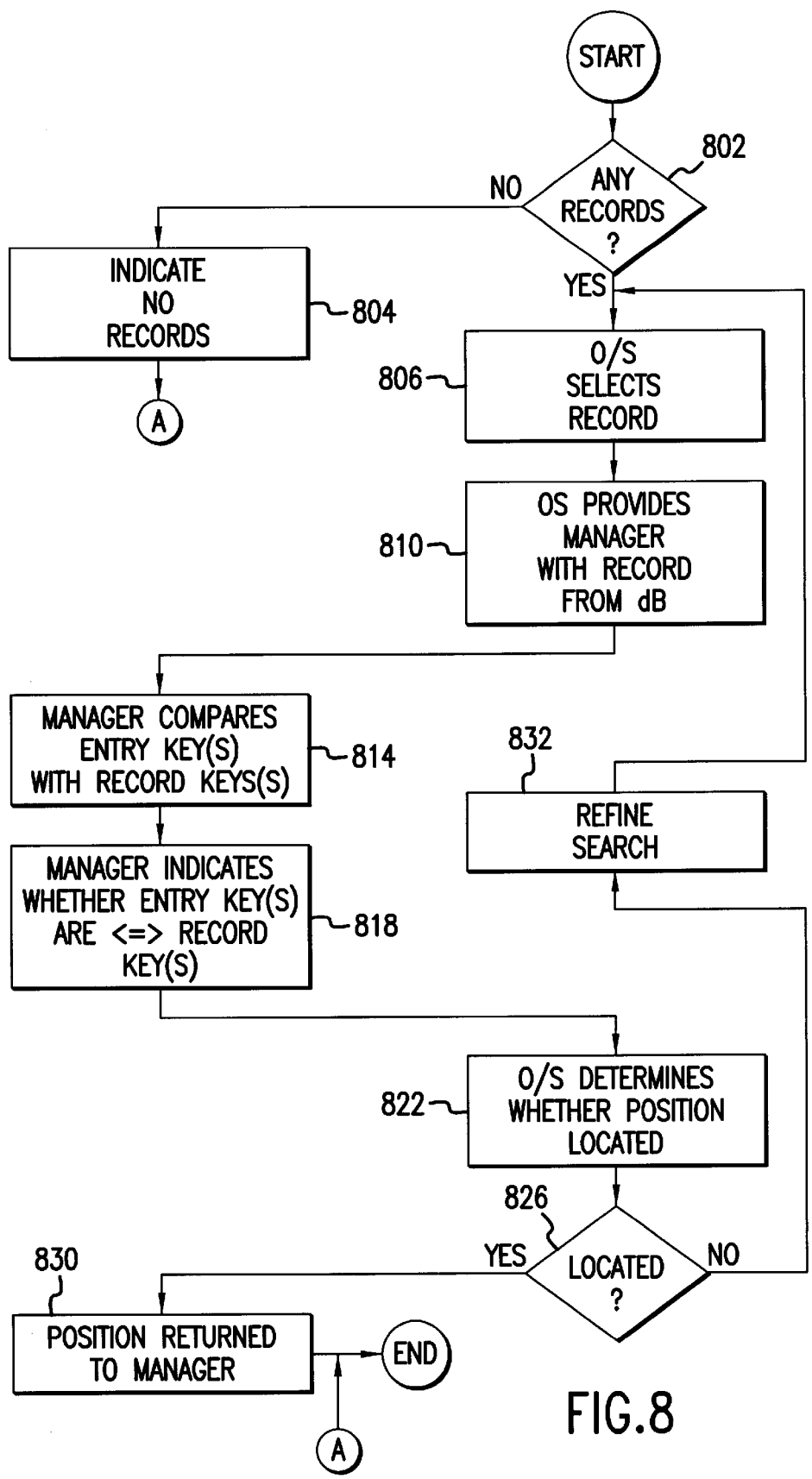
FIG. 8 is a high-level block diagram depicting aspects of computing devices contemplated as part of, and for use with, embodiments of the present invention, such as a central computer and a personal digital assistant.

An example of internal hardware that could be used for the various devices mentioned above (including PDA 100 and PC 110) is now shown with regard to FIG. 8. Referring to FIG. 8, a CPU 904 is in communication with a memory/storage device 906 via bus 902. CPU 904 can be any number of different types of processors, including those manufactured by Intel Corporation or Motorola of Schaumberg, Ill. The memory/storage device 906 can be any number of different types of memory devices such as DRAM and SRAM as well as various types of storage devices, including magnetic and optical media. Furthermore, memory/storage device 906 can also take the form of a transmission.

Embodiments of the present invention contemplate that various portions of software for implementing the various aspects of the present invention as previously described can reside in memory/storage device 906.

A display device 908 is also shown, which could be any number of devices conveying visual and/or audio information to a user. Also in communication with bus 902 is a transfer interface 910 for allowing device 900 to interface with other devices.

In general, it should be emphasized that the various components of embodiments of the present invention can be implemented in hardware, software, or a combination thereof. In such embodiments, the various components and steps would be implemented in hardware and/or software to perform the functions of the present invention. Any presently available or future developed computer software language and/or hardware components can be employed in such embodiments of the present invention. For example, at least some of the functionality mentioned above could be implemented using C or C++ programming languages.

It is also to be appreciated and understood that the specific embodiments of the invention described hereinbefore are merely illustrative of the general principles of the invention. Various modifications may be made by those skilled in the art consistent with the principles set forth hereinbefore.

We claim:

1. A method for managing information on a personal digital assistant, said method comprising the steps of:
   (1) executing an application which utilizes a multikeyed table for maintaining a sorted list of records on said personal digital assistant, wherein each record of said sorted list of records is capable of storing information and comprises a plurality of fields, wherein one field of said plurality of fields is designated as a primary key and at least one additional field of said plurality of fields is designated as a secondary key;
   (2) receiving a target record to be added, deleted, or manipulated within said table and comparing primary and secondary keys of said received record to be added, deleted, or manipulated with primary and secondary keys of a record retrieved from said table.

2. The method of claim 1, further comprising repeating said step of sorting (2) until a record having primary and secondary keys equal to said primary and secondary keys of said record to be added, deleted, or manipulated is identified, or until all records in said table are identified as having primary and secondary keys greater than or equal to said primary and secondary keys of said record to be added, deleted, or manipulated.

3. The method of claim 1, wherein said comparing comprises indicating whether primary and secondary keys of said record to be added, deleted, or manipulated are greater than, less than, or equal to the primary and secondary keys of said record retrieved from said table.

4. A method for identifying a target position in a multi-keyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said method comprising the steps of:

(1) receiving target primary and secondary keys for identifying said target position;
(2) selecting and returning one record stored in said table;
(3) receiving said one record selected in step (2);
(4) comparing and indicating whether said target primary and secondary keys are greater than, less than, or equal to the primary and secondary keys of said one record; and
(5) repeating steps (3)–(4) until a record with primary and secondary keys equal to said target primary and secondary keys is located, at which point said one record is identified as said target position, or until all records stored in said table have been identified as having primary and secondary keys greater than or less than said target primary and secondary keys, at which point said target position is identified as falling between a largest record having primary and secondary keys less than said target primary and secondary keys and a smallest record having primary and secondary keys greater than said target primary and secondary keys.

5. The method of claim 4, further comprising the step of: adding a record to, deleting a record from, returning a record stored at, or returning a record stored after said target position.

6. The method of claim 4, wherein said one or more records of said multikeyed table are sorted first by primary key order then by secondary key order.

7. The method of claim 4, wherein said one or more records are indexed only by primary and secondary keys.

8. The method of claim 4, further comprising the step of reading data from said target position and comparing said primary and secondary keys from said target position against said target primary and secondary keys entered in step (1).

9. The method of claim 8, further comprising deleting a record from said target position only if said primary and secondary keys read from said target position are equal to said target primary and secondary keys entered in step (2).

10. The method of claim 8, further comprising adding a record to said target position only if said primary and secondary keys read from said target position are not equal to said target primary and secondary keys entered in step (2).

11. A method for identifying a target position in a multikeyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said method comprising the steps of:
(1) receiving target primary and secondary keys for identifying said target position;
(2) identifying said target position by:
   (a) selecting one record from said table according to a selection process;
   (b) comparing and indicating whether said target primary and secondary keys are greater than, less than, or equal to the primary and secondary keys of said one record;
   (c) refining said selection process, if said target primary and secondary keys are not equal to the primary and secondary keys of said one record, by using said indication of whether said target primary and secondary keys are greater than or less than said primary and secondary keys of said one record;
   (d) identifying said one record as occupying said target position if said target primary and secondary keys are equal to the primary and secondary keys of said one record; and
   (e) repeating steps (a)–(c), if said target primary and secondary keys are not equal to the primary and secondary keys of said one record, until all records have been retrieved and compared with said target primary and secondary keys, at which point said target position is identified as falling between a largest record having primary and secondary keys less than said target primary and secondary keys and a smallest record having primary and secondary keys greater than said target primary and secondary keys.

12. The method of claim 11, wherein said selection process of step (a) comprises a binary sorting routine.

13. A system for managing information comprising:
a personal digital assistant comprising a memory and a processor, wherein said processor is capable of:
   (1) executing an application which utilizes a multikeyed table, implementable in said memory, for maintaining a sorted list of records, wherein each record of said sorted list of records is capable of storing information and comprises a plurality of fields, wherein one field of said plurality of fields is designated as a primary key and at least one additional field of said plurality of fields is designated as a secondary key; and
   (2) receiving a target record to be added, deleted, or manipulated within said table and comparing primary and secondary keys of said received target record to be added, deleted, or manipulated with primary and secondary keys of a record retrieved from said table.

14. The system of claim 13, wherein said processor is capable of repeating said sorting until a record having primary and secondary keys equal to said primary and secondary keys of said record to be added, deleted, or manipulated is identified, or until all records in said table are identified as having primary and secondary keys greater than or equal to said primary and secondary keys of said record to be added, deleted, or manipulated.

15. The system of claim 13, wherein said processor is capable of indicating whether primary and secondary keys of said record to be added, deleted, or manipulated are greater than, less than, or equal to the primary and secondary keys of said record retrieved from said table.

16. A system for identifying a target position in a multikeyed table comprising:
a personal digital assistant comprising a memory and a processor, wherein said table is implemented in said memory and comprises one or more records with each record comprising a plurality of fields, wherein one field of said plurality of fields is designated as a primary key and at least one additional field of said plurality of fields is designated as a secondary key, wherein said primary and secondary keys of each record are used in ordering said records, and wherein said processor is capable of:
(1) receiving target primary and secondary keys for identifying said target position;
(2) selecting and returning one record stored in said table;
(3) receiving said one record selected step (2);
(4) comparing and indicating whether said target primary and secondary keys are greater than, less than, or equal to the primary and secondary keys of said one record; and
(5) repeating steps (3)–(4) until a record with primary and secondary keys equal to said target primary and secondary keys is located, at which point said one record is identified as said target position, or until all records stored in said table have been identified as having primary and secondary keys greater than or less than said target primary and secondary keys, at which point said target position is identified as falling between a largest record having primary and secondary keys less than said target primary and secondary keys and a smallest record having primary and secondary keys greater than said target primary and secondary keys.

17. The system of claim 16, wherein said processor is capable of: adding a record to, deleting a record from, returning a record stored at, or returning a record stored after said target position.

18. The system of claim 16, wherein said one or more records of said multikeyed table are sorted first by primary key order then by secondary key order.

19. The system of claim 16, wherein said one or more records are indexed only by primary and secondary keys.

20. The system of claim 16, wherein said processor is capable of reading data from said target position and comparing said primary and secondary keys from said target position against said target primary and secondary keys entered in step (1).

21. The system of claim 20, wherein said processor is capable of deleting a record from said target position only if said primary and secondary keys read from said target position are equal to said target primary and secondary keys entered in step (2).

22. The system of claim 20, wherein said processor is capable of adding a record to said target position only if said primary and secondary keys read from said target position are not equal to said target primary and secondary keys entered in step (2).

23. A system for identifying a target position in a multikeyed table comprising:
   a personal digital assistant comprising a memory and a processor, wherein said table is implemented in said memory and comprises one or more records with each record comprising a plurality of fields, wherein one field of said plurality of fields is designated as a primary key and at least one additional field of said plurality of fields is designated as a secondary key, wherein said primary and secondary keys of each record are used in ordering said records, and wherein said processor is capable of:
   (1) receiving target primary and secondary keys for identifying said target position;
   (2) identifying said target position by:
      (a) selecting one record from said table according to a selection process;
      (b) comparing and indicating whether said target primary and secondary keys are greater than, less than, or equal to the primary and secondary keys of said one record;
      (c) refining said selection process, if said target primary and secondary keys are not equal to the primary and secondary keys of said one record, by using said indication of whether said target primary and secondary keys are greater than or less than said primary and secondary keys of said one record;
      (d) identifying said one record as occupying said target position if said target primary and secondary keys are equal to the primary and secondary keys of said one record; and
      (e) repeating steps (a)–(c), if said target primary and secondary keys are not equal to the primary and secondary keys of said one record, until all records have been retrieved and compared with said target primary and secondary keys, at which point said target position is identified as falling between a largest record having primary and secondary keys less than said target primary and secondary keys and a smallest record having primary and secondary keys greater than said target primary and secondary keys.

24. The system of claim 23, wherein said selection process of step (a) comprises a binary sorting routine.

25. A computer program embodied on a computer-readable medium for managing information on a personal digital assistant, said program comprising:
   computer-readable instructions for executing an application which utilizes a multikeyed table for maintaining a sorted list of records on said personal digital assistant, wherein each record of said sorted list of records is capable of storing information and comprises a plurality of fields, wherein one field of said plurality of fields is designated as a primary key and at least one additional field of said plurality of fields is designated as a secondary key; and
   computer-readable instructions for receiving a target record to be added, deleted, or manipulated within said table and comparing primary and secondary keys of said received target record to be added, deleted, or manipulated with primary and secondary keys of a record retrieved from said table.

26. The computer program of claim 25, wherein said instructions comprises instructions for repeating said sorting until a record having primary and secondary keys equal to said primary and secondary keys of said record to be added, deleted, or manipulated is identified, or until all records in said table are identified as having primary and secondary keys greater than or equal to said primary and secondary keys of said record to be added, deleted, or manipulated.

27. The computer program of claim 25, wherein said instructions for comparing comprises instructions for indicating whether primary and secondary keys of said record to be added, deleted, or manipulated are greater than, less than, or equal to the primary and secondary keys of said record retrieved from said table.

28. A computer program embodied on a computer-readable medium for identifying a target position in a multikeyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said computer program comprising instructions for:
   (1) receiving target primary and secondary keys for identifying said target position;
   (2) selecting and returning one record stored in said table;
   (3) receiving said one record selected in step (2);
   (4) comparing and indicating whether said target primary and secondary keys are greater than, less than, or equal to the primary and secondary keys of said one record; and
   (5) repeating steps (3)–(4) until a record with primary and secondary keys equal to said target primary and secondary keys is located, at which point said one record is identified as said target position, or until all records stored in said table have been identified as having primary and secondary keys greater than or less than said target primary and secondary keys, at which point said target position is identified as falling between a largest record having primary and secondary keys less than said target primary and secondary keys and a smallest record having primary and secondary keys greater than said target primary and secondary keys.

29. The computer program of claim 28, further comprising instructions for: adding a record to, deleting a record from, returning a record stored at, or returning a record stored after said target position.

30. The computer program of claim 28, wherein said one or more records of said multikeyed table are sorted first by primary key order then by secondary key order.

31. The computer program of claim 28, wherein said one or more records are indexed only by primary and secondary keys.

32. The computer program of claim 28, further comprising instructions for reading data from said target position and comparing said primary and secondary keys from said target position against said target primary and secondary keys entered in step (1).

33. The computer program of claim 32, further comprising instructions for deleting a record from said target position only if said primary and secondary keys read from said target position are equal to said target primary and secondary keys entered in step (2).

34. The computer program of claim 32, further comprising instructions for adding a record to said target position only if said primary and secondary keys read from said target position are not equal to said target primary and secondary keys entered in step (2).

35. A computer program embodied on a computer-readable medium for identifying a target position in a multikeyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said computer program comprising instructions for:
  (1) receiving target primary and secondary keys for identifying said target position;
  (2) identifying said target position by:
    (a) selecting one record from said table according to a selection process;
    ()b) comparing and indicating whether said target primary and secondary keys are greater than, less than, or equal to the primary and secondary keys of said one record;
    (c) refining said selection process, if said target primary and secondary keys are not equal to the primary and secondary keys of said one record, by using said indication of whether said target primary and secondary keys are greater than or less than said primary and secondary keys of said one record;
    (d) identifying said one record as occupying said target position if said target primary and secondary keys are equal to the primary and secondary keys of said one record; and
    (e) repeating steps (a)–(c), if said target primary and secondary keys are not equal to the primary and secondary keys of said one record, until all records have been retrieved and compared with said target primary and secondary keys, at which point said target position is identified as falling between a largest record having primary and secondary keys less than said target primary and secondary keys and a smallest record having primary and secondary keys greater than said target primary and secondary keys.

36. The computer program of claim 35, wherein said selection process of step (a) comprises a binary sorting routine.

37. A system for managing a information on a personal digital assistant, said system comprising:
  means for executing an application which utilizes a multikeyed table for maintaining a sorted list of records on said personal digital assistant, wherein each record of said sorted list of records is capable of storing information and comprises a plurality of fields, wherein one field of said plurality of fields is designated as a primary key and at least one additional field of said plurality of fields is designated as a secondary key; and
  means for receiving a target record to be added, deleted, or manipulated within said table and comparing primary and secondary keys of said received target record to be added, deleted, or manipulated with primary and secondary keys of a record retrieved from said table.

38. The system of claim 37, further comprising means for repeating said sorting until a record having primary and secondary keys equal to said primary and secondary keys of said record to be added, deleted, or manipulated is identified, or until all records in said table are identified as having primary and secondary keys greater than or equal to said primary and secondary keys of said record to be added, deleted, or manipulated.

39. The system of claim 37, wherein said means for comparing comprises means for indicating whether primary and secondary keys of said record to be added, deleted, or manipulated are greater than, less than, or equal to the primary and secondary keys of said record retrieved from said table.

40. A system for identifying a target position in a multikeyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said system comprising:
  means for receiving target primary and secondary keys for identifying said target position;
  means selecting and returning one record stored in said table;
  means for receiving said one record selected by said means for selecting and returning;
  means for comparing and indicating whether said target primary and secondary keys are greater than, less than, or equal to the primary and secondary keys of said one record; and
  means for repeating said receiving and said comparing and indicating until a record with primary and secondary keys equal to said target primary and secondary keys is located, at which point said one record is identified as said target position, or until all records stored in said table have been identified as having primary and secondary keys greater than or less than said target primary and secondary keys, at which point said target position is identified as falling between a largest record having primary and secondary keys less than said target primary and secondary keys and a smallest record having primary and secondary keys greater than said target primary and secondary keys.

41. The system of claim 40, further comprising means for adding a record to, deleting a record from, returning a record stored at, or returning a record stored after said target position.

42. The system of claim 40, wherein said one or more records of said multikeyed table are sorted first by primary key order then by secondary key order.

43. The system of claim 40, wherein said one or more records are indexed only by primary and secondary keys.

44. The system of claim 40, further comprising means for reading data from said target position and comparing said primary and secondary keys from said target position against said target primary and secondary keys.

45. The system of claim 44, further comprising means for deleting a record from said target position only if said primary and secondary keys read from said target position are equal to said target primary and secondary keys.

46. The system of claim 44, further comprising means for adding a record to said target position only if said primary and secondary keys read from said target position are not equal to said target primary and secondary keys.

47. A system for identifying a target position in a multikeyed table, wherein said table is implemented in a personal digital assistant and comprises one or more records with each record comprising a plurality of fields, wherein one field of said plurality of fields is designated as a primary key and at least one additional field of said plurality of fields is designated as a secondary key, and wherein said primary and secondary keys of each record are used in ordering said records, said system comprising:

means for receiving target primary and secondary keys for identifying said target position;

means for identifying said target position by:
  (a) selecting one record from said table according to a selection process;
  (b) comparing and indicating whether said target primary and secondary keys are greater than, less than, or equal to the primary and secondary keys of said one record;
  (c) refining said selection process, if said target primary and secondary keys are not equal to the primary and secondary keys of said one record, by using said indication of whether said target primary and secondary keys are greater than or less than said primary and secondary keys of said one record;
  (d) identifying said one record as occupying said target position if said target primary and secondary keys are equal to the primary and secondary keys of said one record; and
  (e) repeating steps (a)–(c), if said target primary and secondary keys are not equal to the primary and secondary keys of said one record, until all records have been retrieved and compared with said target primary and secondary keys, at which point said target position is identified as falling between a largest record having primary and secondary keys less than said target primary and secondary keys and a smallest record having primary and secondary keys greater than said target primary and secondary keys.

48. The system of claim 47, wherein said selection process of step (a) comprises a binary sorting routine.

* * * * *